United States Patent
Bock et al.

(10) Patent No.: US 10,908,358 B1
(45) Date of Patent: Feb. 2, 2021

(54) SCALABLE OPTICAL FRONT END SYSTEM FOR FREE SPACE OPTICAL COMMUNICATION

(71) Applicant: Lockheed Martin Corporation, Bethesda, MD (US)

(72) Inventors: Kevin R. Bock, San Jose, CA (US); Guy Chriqui, San Mateo, CA (US); Eric Verne Eason, Palo Alto, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 16/719,858

(22) Filed: Dec. 18, 2019

(51) Int. Cl.
| | |
|---|---|
| *G02B 6/26* | (2006.01) |
| *G02B 6/43* | (2006.01) |
| *G02B 6/42* | (2006.01) |
| *G02B 6/36* | (2006.01) |
| *H04B 10/25* | (2013.01) |
| *H04B 10/112* | (2013.01) |

(52) U.S. Cl.
CPC ............. *G02B 6/26* (2013.01); *G02B 6/3644* (2013.01); *G02B 6/426* (2013.01); *G02B 6/4246* (2013.01); *G02B 6/43* (2013.01); *H04B 10/2589* (2020.05); *H04B 10/1123* (2013.01)

(58) Field of Classification Search
CPC . G02B 6/26; G02B 6/43; G02B 6/426; G02B 6/4246; G02B 6/3644; H04B 10/2589; H04B 10/1123
See application file for complete search history.

(56) References Cited

U.S. PATENT DOCUMENTS

| | | | | |
|---|---|---|---|---|
| 5,281,807 | A * | 1/1994 | Poisel | G01B 11/00 250/206.2 |
| 5,589,351 | A * | 12/1996 | Harootunian | G01N 21/645 356/318 |
| 7,289,197 | B2 * | 10/2007 | Kewitsch | G01J 1/04 356/73.1 |
| 8,696,992 | B2 * | 4/2014 | Tajima | G01J 3/0208 422/82.05 |
| 9,465,161 | B2 * | 10/2016 | Hagen | G02B 6/06 |
| 10,419,120 | B2 * | 9/2019 | Bock | H04B 10/64 |
| 10,451,550 | B2 * | 10/2019 | Hagen | G01N 21/645 |
| 2019/0260471 | A1 * | 8/2019 | Brown | H04B 10/11 |

* cited by examiner

*Primary Examiner* — Ryan A Lepisto
(74) *Attorney, Agent, or Firm* — Morgan, Lewis & Bockius LLP (57) ABSTRACT

A scalable front end system for a high speed free space optical (FSO) communication system includes multiple optical array assemblies. Each optical array assembly includes an optical array, an angle sensor, a steering system and a base. The multiple optical array assemblies are coupled to respective electro-optic modulators, which in turn are coupled to a splitter, all disposed within an enclosure with one input/output connection.

20 Claims, 7 Drawing Sheets

SCALABLE OPTICAL FRONT END SYSTEM FOR FREE SPACE OPTICAL COMMUNICATION

STATEMENT REGARDING FEDERALLY SPONSORED RESEARCH OR DEVELOPMENT

Not applicable

FIELD OF THE INVENTION

The present invention generally relates to free space optical (FSO) communications, and more particularly, to a scalable front end system for high speed FSO communications.

BACKGROUND

Many optical FSO systems are inherently monolithic. Scalability of such monolithic systems requires rework or customization of the system to accommodate a larger collection aperture. Such customized systems tend to be large and bulky optics that require precision pointing across an optical train. This results in very large and complex systems that are difficult to configure for different environments.

A typical FSO system has a single optical front end (OFE) and an associated steering system (e.g., gimbal) housed in an enclosure, with no electro-optic modulator. Scaling to a larger system, however, requires growing the optical aperture and the entire supporting system to accommodate the larger telescope. The resulting customized system is difficult to manufacture, much less to replicate to produce multiple similar systems.

SUMMARY

In some aspects, optical array system includes an enclosure and a plurality of optical array assemblies. Each optical array assembly includes an optical array having a plurality of optical lenses and a plurality of respective cable connectors disposed in a housing, an angle sensor, a steering system and a base. The optical array system also includes a plurality of electro-optic modulators, each coupled to one of the plurality of optical array assemblies. The optical array system further includes a splitter coupled to the plurality of electro-optic modulators and having an input/output connector configured to couple to a component of a free space optical (FSO) communications system.

In other aspects, a method of providing a scaled optical array system for a collection aperture includes providing a plurality of optical array assemblies comprising a plurality of optical lenses and respective optical connectors, an angle sensor, a steering system and a base. The method also includes coupling, for each optical array assembly, the plurality of optical connectors via a plurality of respective optical fibers to one of a plurality of electro-optic modulators. The method also includes coupling an output of each of the plurality of electro-optic modulators to a multi-input optical combiner. The method also includes fixedly coupling each of the plurality of optical array assemblies, the plurality of electro-optic modulators and the multi-input optical combiner within an enclosure. A single input/output connector of the multi-input optical combiner is configured to be coupled to a device of a free space optical (FSO) communications system via a single cable.

In yet other aspects, a free-space optical (FSO) communication system includes at least two optical array systems. Each optical array system includes a plurality of optical array assemblies, each optical array assembly comprising a plurality of optical arrays each having a plurality of optical lenses and a plurality of respective cable connectors disposed in a housing, an angle sensor, a steering system and a base. Each optical array system also includes a plurality of electro-optic modulators, each coupled to one of the plurality of optical array assemblies and a splitter coupled to the plurality of electro-optic modulators. The plurality of optical array assemblies, the plurality of electro-optic modulators and the splitter are respectively coupled via fiber optic cables. The plurality of optical array assemblies, the plurality of electro-optic modulators, the splitter and the fiber optic cables are disposed within a single enclosure. The FSO communication system also includes at least two FSO modems, each coupled to a respective one of the at least two optical array systems, each FSO modem configured to communicate with at least one communications network. Each of the optical array assemblies is configured to be independently pointed to configure the optical array system for a collection aperture.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to methods and configurations for providing a scalable optical front end system for high speed FSO communications. The disclosed scalable optical front end solution can be adapted to any size aperture by combining many sub-apertures into one or more optical array assemblies. Each of the sub-apertures consists of a telescope (e.g., a lens) that focuses light onto a single-mode fiber. Each of single-mode fibers is well phased in order to combine the light and improve the signal-to-noise ratio (SNR) of the receiver. Enabling accommodation of a larger collection aperture traditionally requires rework (e.g., remanufacturing) of a monolithic FSO system.

The proposed solution has significant advantages over the traditional reworking solution. For example, the scalable optical front end system of the subject technology utilizes basic building block optical array assemblies that can be combined as needed within a single enclosure. Therefore, the disclosed solution can scale up to very large collection apertures without requiring rework or complex combining of bulky EFOs. The scalable optical front end system of the subject technology is substantially smaller and lighter and offers several substantial space, weight, and power (SWAP) saving features over the traditional approach. First, for a large collection aperture, the scalable optical front end system has a fraction of a enclosure space of the traditional monolithic system resulting in a substantial volume and weight savings. Second, the traditional monolithic solution requires the optical front end for the entire collection aperture to point in a single direction, whereas the disclosed solution allows each building block optical array to be independently pointed and to provide its own coarse pointing ability. This results in a significant optimization across the collection aperture, as well as the ability to subdivide the aperture that can be electronically reconfigured. The alignment/reconfiguration of the optical arrays for the disclosed approach is significantly easier and can be done reliably and repeatedly without spending extensive expert man-hours. Third, the entire optical array system is contained within one enclosure having a single input/output cable. Thus, only one cable connection needs to be made in the field, immensely simplifying installation and maintenance by technicians, as well as minimizing system breakdowns from extensive cabling between components of the FSO system.

Figure 1:
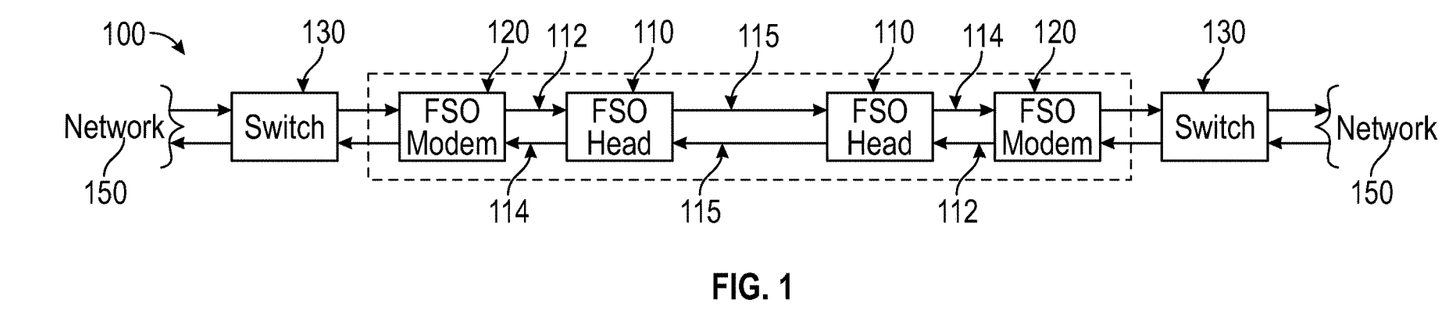
FIG. 1 is a block diagram illustrating an example of an FSO communication system.

FIG. 1 is a block diagram illustrating an example of a free-space optical (FSO) communication system 100 of the subject technology. The FSO system 100 includes FSO transceivers (e.g., optical front ends, heads) 110 optically communicating with one another through open space. Each FSO transceiver 110 is coupled to an FSO modem 120, which in turn is in communication with a network 150 via a network switch 130. Examples of the network 150 include the Internet, a local area network (LAN), an Ethernet network, or other networks). In one or more aspects, the FSO transceiver 110 receives optical signals 112 from the FSO modem 120 and transmits electrical signals 114 to the FSO modem 120. Communications between the FSO modem 120 and the switch 130 and between the switch 130 and the network 150 is through electrical signals. The subject technology provides the FSO transceiver 110 that is capable of scaling up the collection aperture as needed within a single enclosure with only a single input/output cable to be connected in the field.

FIGS. 2A through 2F are diagrams illustrating examples of an optical array assembly 200 and corresponding components, according to certain aspects of the subject technology. In some aspects, the optical array assembly 200 includes an optical array 210, an angle sensor (e.g. optical angle sensor) 220, a steering system 230 and a base 250. The base 250 may be coupled or mounted to a mounting member (e.g., bracket) 260. The optical array 210, as shown in a side-view in FIG. 2B, a perspective view in FIG. 2D and an exploded perspective view in FIG. 2E, includes multiple optical lenses (e.g., COTS lenses) 212 and multiple corresponding cable connectors (e.g., fiber ferrules and pucks) 214 disposed in a housing 216. The cable connectors 214 are coupled via a number of cables (e.g., optical fibers) 218 to another component of an optical array system (e.g., a phase modulator). In one or more aspects, the cables 218 are single mode optical fibers and the optical array 210 is a compact assembly, for example.

Figure 2A:
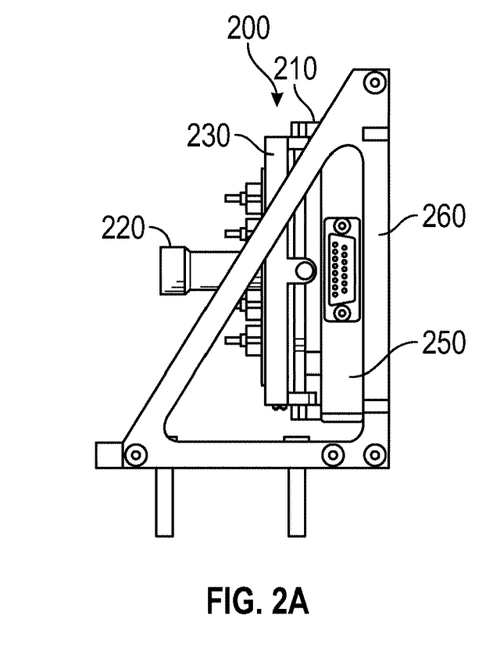
FIGS. 2A through 2F are diagrams illustrating examples of an optical array assembly and corresponding components, according to certain aspects.
Figure 2B:
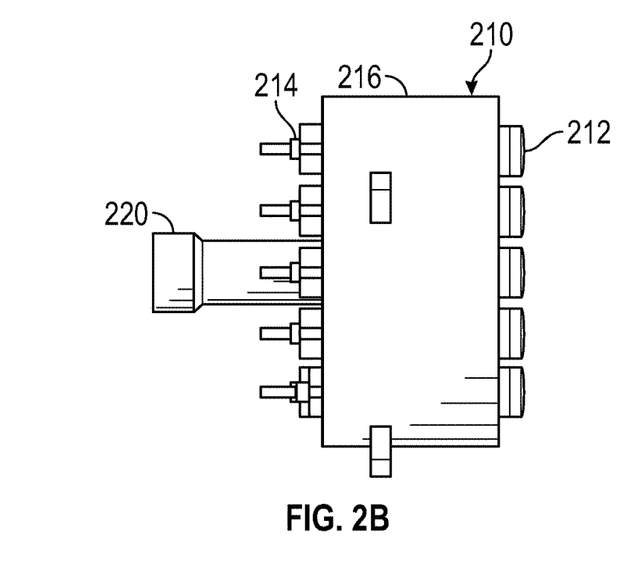
Figure 2C:
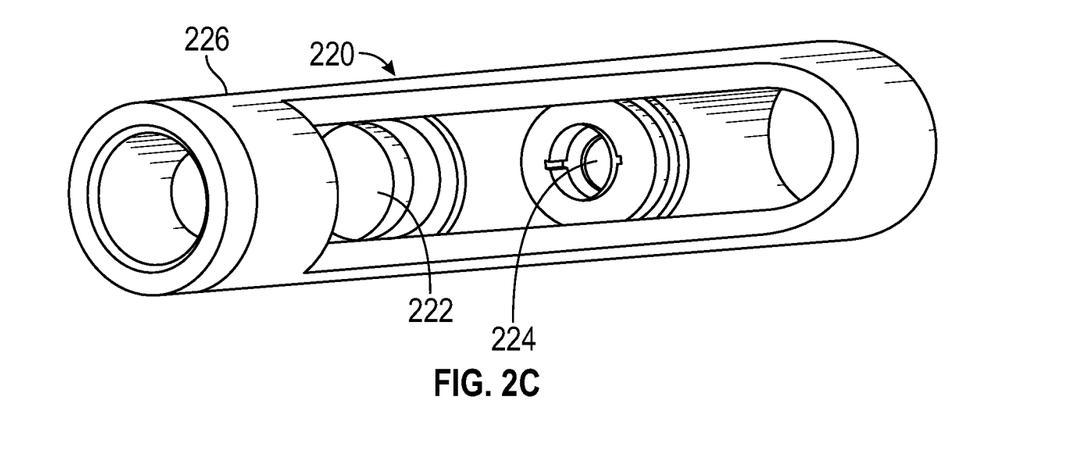
Figure 2D:
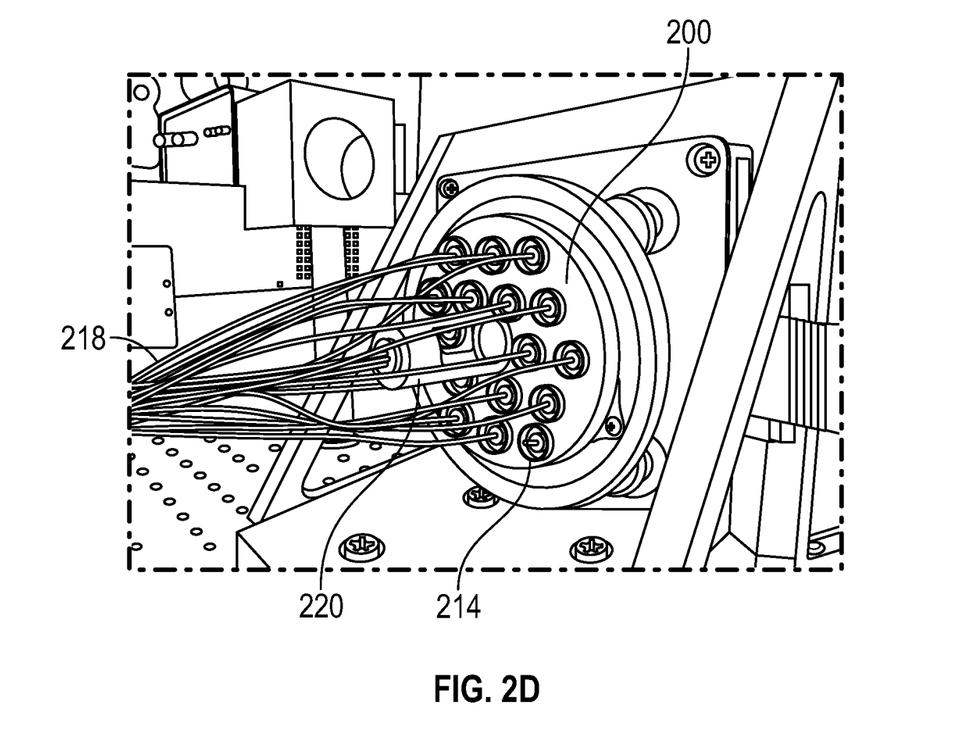
Figure 2E:
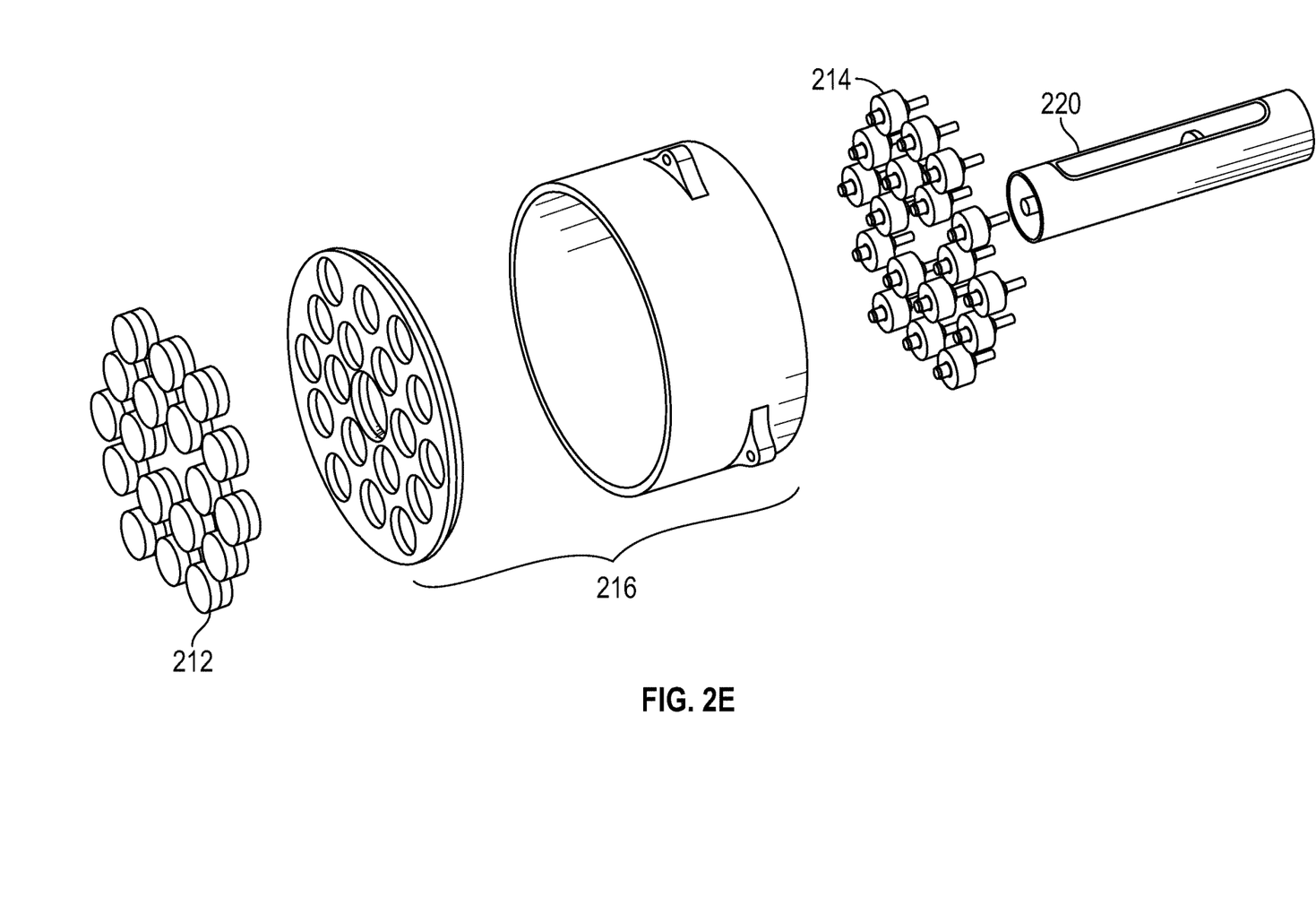

The arrangement of the optical lenses 212 and the cable connectors 214 in the optical array 210 may be different from that shown in FIGS. 2D and 2E. For example, there may be a lesser or greater number of optical lenses 212, and a corresponding number of cable connectors 214, disposed in the housing 216. As another example, the housing 216 may be circular as shown in FIG. 2D, or any other desired shape (e.g., square, rectangular). The number of optical lenses 212 and corresponding number of cable connectors 214 may equate to an equal number of channels. For example, the optical array assembly 200 shown in FIGS. 2D and 2E has sixteen optical lenses 212 and cable connectors 214, which provides a collection aperture of sixteen channels.

The optical array 210 is coupled to the angle sensor 220 and the steering system 230 and mounted to the base 250 as shown in FIG. 2A to form an optical array assembly 200. The optical array assembly 200 may be configured as a receiver, as a transmitter or as a transceiver. For example, one optical array assembly 200 may be configured only as a receiver for receiving signals from another optical array assembly 200 configured only as a transmitter. As another example, two optical array assemblies 200 may each be configured as a transceiver capable of transmitting to and receiving signals from the other optical array assembly 200.

Figure 2F:
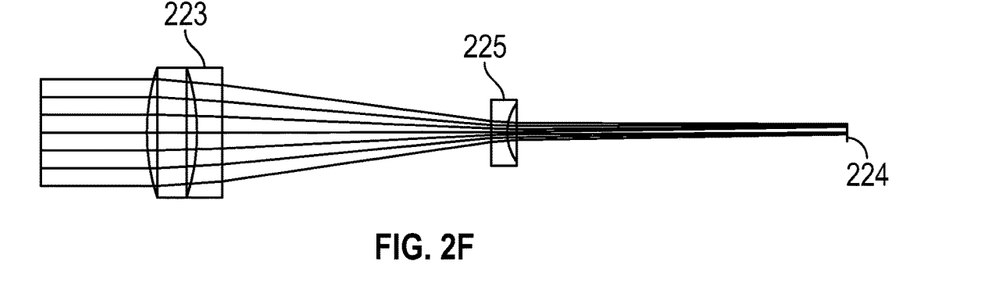

As shown in FIG. 2E, the angle sensor 220 may be disposed at the center of the optical array assembly 200. The angle sensor 220 may be configured as a coarse acquisition system. The angle sensor 220 may include a small telescope 222 and a detector 224 disposed at the focus of the telescope 222 within a sensor housing 226, as shown in FIG. 2C. For example, the telescope 222 may be formed by two spaced apart lenses 223, 225 in the housing 226 and the detector 224 may be a position sensor diode spaced apart from the lenses, as schematically depicted in FIG. 2F. The angle sensor 220 may provide for coarse pointing (e.g., alignment) of the optical array assembly 200, which may assist in defining acquisition schemes. In some aspects of the disclosure, the angle sensor 220 may be a system configured to detect an incoming beam by a sensor disposed at the center of the optical array assembly 220. In some aspects of the disclosure, the angle sensor 220 may be a system configured to detect the incoming beam by information received from a plurality of channels of the optical array assembly 220.

The optical array assembly 200 may provide the ability to accommodate for platform jitter non-mechanically. The optical array assembly 200 may be integrated for a coarse pointing ability into a pointing system, which may be a physical fast steering mirror (FSM) or a non-mechanical beam steering liquid crystal polarization system, for example. Thus, independent pointing of each optical array assembly 200 may be provided. Such independent pointing of each optical array assembly 200 may provide for optimizing performance across the collection aperture. Independent pointing of each optical array assembly 200 may also provide for multiple links with a subdivided collection aperture that is electronically reconfigurable.

Figure 3A:
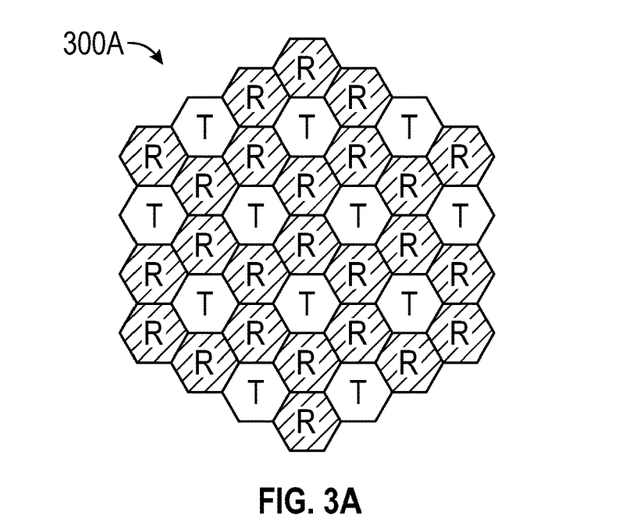
FIGS. 3A and 3B are diagrams illustrating examples of optical array arrangements, according to certain aspects.

FIGS. 3A-3B are diagrams illustrating examples of an array of optical elements, according to certain aspects of the subject technology. An array configuration 300A, shown in FIG. 3A, is a locally bi-static solution for phase control, where receiver (R) and transmitter (T) sub-apertures are alternated and none of the sub-apertures are shared. In the array configuration 300A, the sub-apertures (e.g., R and T) are configured so that interpolating the measured phased from the received sub-apertures provides a good approximation to the phase over the T sub-aperture. This has advantages as in the bi-static solutions, secondary reflections from optics that can blind the receiver sensors, due to the transmit power being orders of magnitude higher than the received power, is of no concern.

Figure 3B:
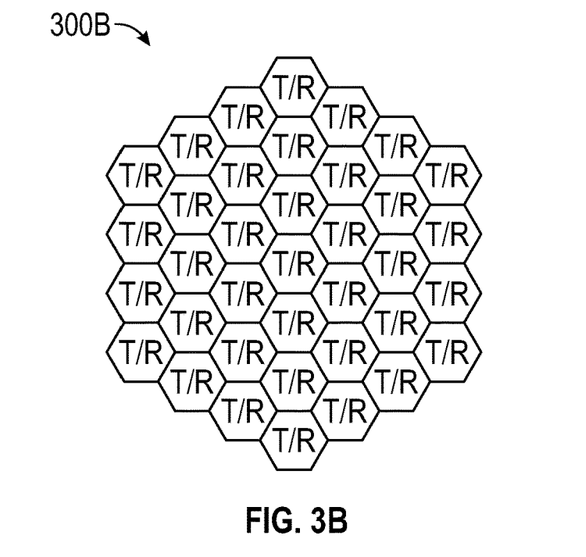

In a locally mono-static solution for phase control, as shown in an array configuration 300B shown in FIG. 3B, the receiver (R) and transmitter (T) sub-apertures are shared. The array configuration 300B is configured so that the receiver senses the exact phase it needs to apply to the transmitter and a sufficient rejection of the back-reflected transmitted light is provided to prevent corruption and/or blinding the receiver sensor. This can be done by using polarization diversity, for example, by transmitting in one polarization and receiving in another, or by transmitting and receiving at different wavelengths and using narrowband filters to reject back reflections. In the locally mono-static solution, the entire area of the array can be used for transmission, as opposed to the bi-static solution that allows transmission from a limited portion of the entire aperture of the array (e.g., T sub-apertures).

As discussed above, each optical array assembly 200 forms a basic building block that can be scaled according to requirements. Multiple optical array assemblies 200 may be combined in a single enclosure to provide an minimized footprint that may be efficiently manufactured, installed and maintained in the field.

Figure 4A:
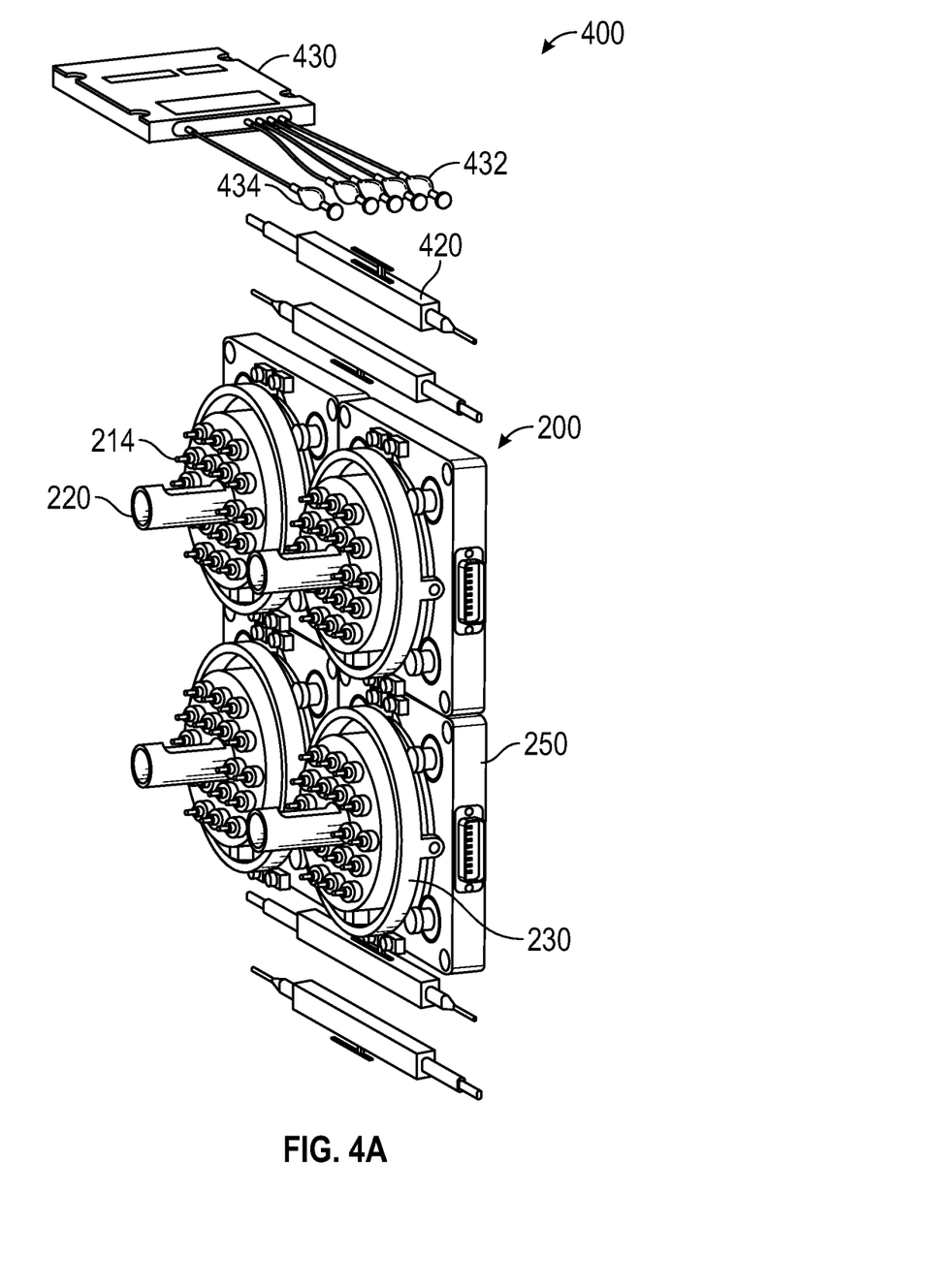
FIGS. 4A-4B are diagrams illustrating examples of a scaled optical array system, according to certain aspects.
Figure 4B:
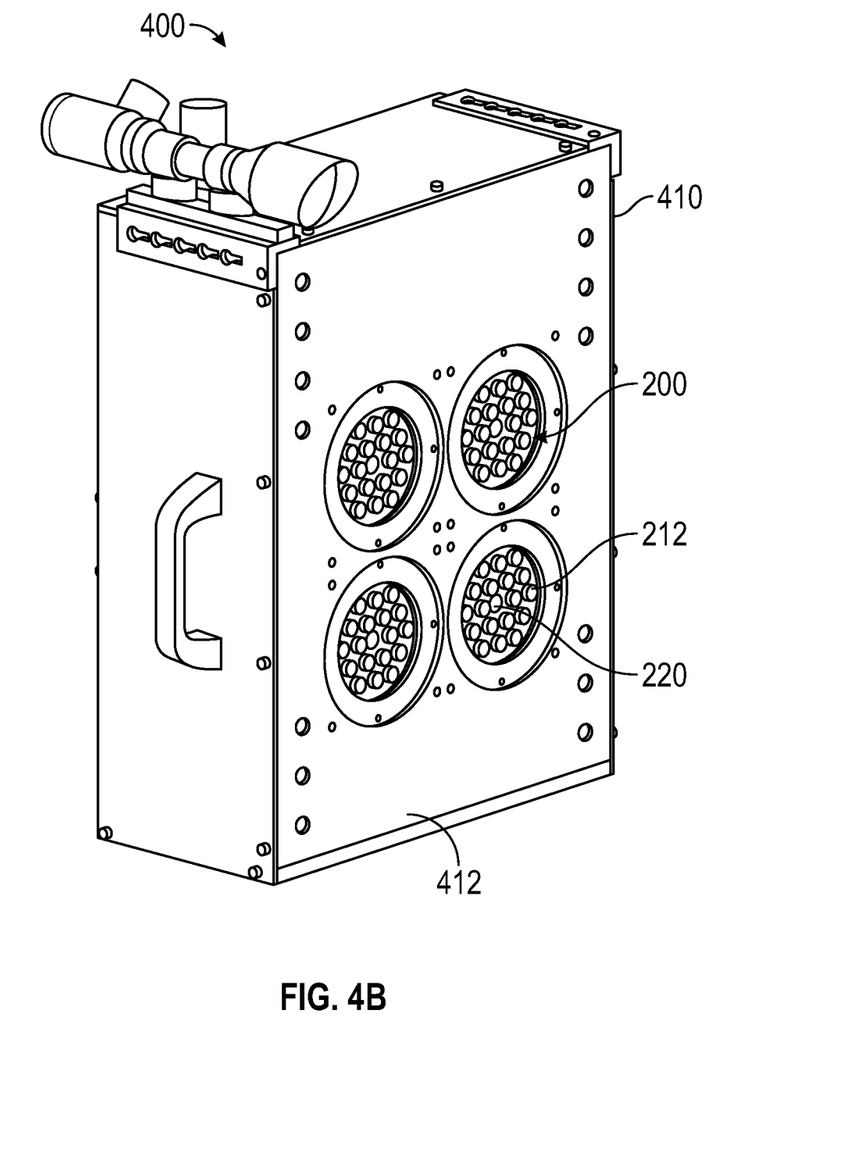

As shown in FIGS. 4A and 4B, an optical array system 400 may have four sixteen channel optical array assemblies 200 combined in a single enclosure 410, for example. The resulting optical array system 400 has a collection aperture of sixty four channels. Each optical array assembly 200 may be coupled to a mounting base 250. The mounting base 250 may be configured to attach or couple to a portion of the enclosure 410, such as an internal surface of a front wall 412 or a mounting frame (e.g., bracket 260), for example. In the optical array system 400 shown in FIGS. 4A and 4B, the four mounting bases 250 may be individually coupled to the front wall 412. In another example, the mounting bases 250 may be coupled together and collectively coupled to the front wall 412.

The optical array system 400 shown in FIG. 4A may also include an electro-optic modulator (EOM) (420) associated with each optical array assembly 200. For example, the EOM 420 may be a one by sixteen modulator configured to be associated with the sixteen channels of the optical array assembly 200. Thus, the example optical array system 400 has four one by sixteen EOMs 420 configured to interact with the sixty four channels of the collection aperture.

The four EOMs 420 are configured to couple to a one by four splitter 430 (e.g., multi input optical combiner), which has four EOM connectors 432 and one IO connector 434. Thus, each optical array assembly 200 may have sixteen optical cables 218 connected to an EOM 420 and each EOM 420 may be connected to an EOM connector 432. Accordingly, the cabling for the sixty four channel collection aperture is stepped down internally within the enclosure 410 such that only a single IO connector 434 is needed to connect the optical array system 400 to other devices, such as FSO modem 120, for example. The optical array system 400 may also include a power source to provide a self-contained optical array system 400 that may be transported, installed and maintained as a singular unit.

An optical array assembly 200 may be configured to handle any desired number of channels and any desired number of optical array assemblies 200 may be combined within an optical array system 400. Thus, the optical array system 400 may be easily scaled to match a collection aperture of any size (e.g., 128 channels).

Figure 5:
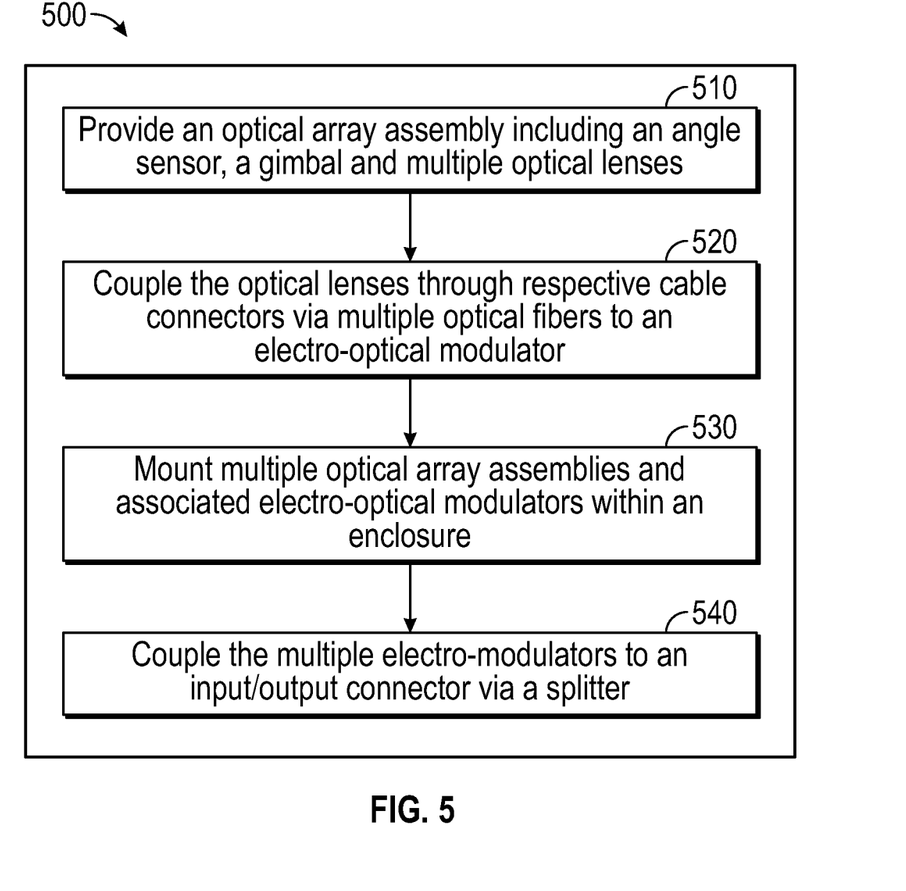
FIG. 5 is a flow diagram illustrating an example of a method for providing a scaled optical array system, according to certain aspects.

FIG. 5 is a flow diagram illustrating an example of a method 500 for providing a scaled optical array system (e.g., 400 of FIG. 4B), according to certain aspects of the subject technology. The method 500 includes providing an optical array assembly (e.g., 200 of FIG. 2A) including multiple optical lenses (e.g., 212 of FIG. 2E), multiple corresponding cable connectors (e.g., 214 of FIG. 2E), an angle sensor (e.g., 220 of FIG. 2A) and a steering system (e.g., 230 of FIG. 2A) (510). The method also includes coupling the optical lenses through associated (e.g., paired) cable connectors via multiple associated cables (e.g., 218 of FIG. 2D) to an electro-optical modulator (e.g., 420 of FIG. 4A) (520). The method further includes mounting multiple optical array assemblies and associated electro-optical modulators within an enclosure (e.g., 410 of FIG. 4B) (530). The method also includes coupling the electro-optical modulators via electro-optical modulator connectors (e.g., 432 of FIG. 4A) to a single input/output connector (e.g., 434 of FIG. 4A) via a splitter (e.g., 430 of FIG. 4A) (540). The resulting scaled optical array system is configured to be coupled to another portion (e.g., device) of an FSO system via a single cable (e.g., fiber optic cable).

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. An optical array system, the system comprising:
    an enclosure;
    a plurality of optical array assemblies, each optical array assembly comprising:
        an optical array having a plurality of optical lenses and a plurality of respective cable connectors disposed in a housing;
        an angle sensor;
        a steering system; and
        a base;
    a plurality of electro-optic modulators, each coupled to one of the plurality of optical array assemblies; and
    a splitter coupled to the plurality of electro-optic modulators and having an input/output connector configured to couple to a component of a free space optical (FSO) communications system.

2. The optical array system of claim 1, wherein the angle sensor is an optical angle sensor disposed at the center of the optical array assembly.

3. The optical array system of claim 1, wherein the angle sensor comprises a system configured to detect an incoming beam by one of a sensor disposed at the center of the optical array assembly and by information received from a plurality of channels of the optical array assembly.

4. The optical array system of claim 1, wherein the angle sensor is configured as a coarse acquisition system providing for coarse pointing of the optical array assembly.

5. The optical array system of claim 4, wherein coarse pointing output of the optical array assembly is configured to be fed into a physical fast steering mirror pointing system.

6. The optical array system of claim 4, wherein coarse pointing output of the optical array assembly is configured to be fed into a non-mechanical beam steering liquid crystal polarization system.

7. The optical array system of claim 1, wherein each optical array assembly is configured to be pointed independently of the other optical array assemblies.

8. The optical array system of claim 7, wherein the one or more optical array assemblies are configured to be independently pointed to reconfigure optical array system performance across a collection aperture.

9. The optical array system of claim 7, wherein the one or more optical array assemblies are configured to be independently pointed to provide links with subdivided portions of a collection aperture.

10. The optical array system of claim 9, wherein a configuration of links is electronically reconfigurable.

11. The optical array system of claim 1, wherein each optical array assembly is configured to non-mechanically compensate for platform jitter.

12. The optical array system of claim 1, wherein at least one of the optical assembly arrays is configured as a receiver.

13. The optical array system of claim 1, wherein at least one of the optical assembly arrays is configured as a transmitter.

14. The optical array system of claim 1, wherein at least one of the optical assembly arrays is configured as a transceiver.

15. A method of providing a scaled optical array system for a collection aperture, the method comprising:
    providing a plurality of optical array assemblies comprising a plurality of optical lenses and respective optical connectors, an angle sensor, a steering system and a base;
    coupling, for each optical array assembly, the plurality of optical connectors via a plurality of respective optical fibers to one of a plurality of electro-optic modulators;
    coupling an output of each of the plurality of electro-optic modulators to a multi-input optical combiner; and
    fixedly coupling each of the plurality of optical array assemblies, the plurality of electro-optic modulators and the multi-input optical combiner within an enclosure,
    wherein a single input/output connector of the multi-input optical combiner is configured to be coupled to a device of a free space optical (FSO) communications system via a single cable.

16. The method of claim 15, further comprising:
    coarsely pointing each optical array assembly using its respective angle sensor;
    feeding coarse pointing output from each optical array assembly into a pointing system; and
    independently pointing each optical array assembly.

17. The method of claim 16, further comprising:
    configuring each individually pointed optical array assembly to link to a portion of a subdivided collection aperture; and
    reconfiguring the subdivided collection aperture electronically.

18. The method of claim 15, further comprising one of:
    configuring at least one optical array assembly as a receiver for receiving optical transmissions from another device of the FSO communications system;
    configuring at least one optical array assembly as a transmitter for sending optical transmissions to another device of the FSO communications system; and
    configuring at least one optical array assembly as a transceiver for sending/receiving optical transmissions to/from another device of the FSO communications system.

19. The method of claim 15, further comprising reconfiguring the scaled optical array system for a larger collection aperture by:
    fixedly coupling an additional optical array assembly and an additional respective electro-optic modulator within the enclosure;
    coupling the additional optical array assembly to the additional electro-optic modulator; and
    coupling the additional electro-optic modulator to the multi-input optical combiner.

20. A free-space optical (FSO) communication system comprising:
- at least two optical array systems, each comprising:
  - a plurality of optical array assemblies, each optical array assembly comprising a plurality of optical arrays each having a plurality of optical lenses and a plurality of respective cable connectors disposed in a housing, an angle sensor, a steering system and a base;
  - a plurality of electro-optic modulators, each coupled to one of the plurality of optical array assemblies; and
  - a splitter coupled to the plurality of electro-optic modulators,
  - wherein the plurality of optical array assemblies, the plurality of electro-optic modulators and the splitter are respectively coupled via fiber optic cables, and
  - wherein the plurality of optical array assemblies, the plurality of electro-optic modulators, the splitter and the fiber optic cables are disposed within a single enclosure; and
- at least two FSO modems, each coupled to a respective one of the at least two optical array systems, each FSO modem configured to communicate with at least one communications network,
- wherein, each of the optical array assemblies is configured to be independently pointed to configure the optical array system for a collection aperture.

* * * * *